United States Patent
Shah et al.

(10) Patent No.: US 7,747,771 B1
(45) Date of Patent: Jun. 29, 2010

(54) REGISTER ACCESS PROTOCOL IN A MULTIHREADED MULTI-CORE PROCESSOR

(75) Inventors: Manish Shah, Austin, TX (US); Robert T. Golla, Round Rock, TX (US); Mark A. Luttrell, Cedar Park, TX (US); Gregory F. Grohoski, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 1351 days.

(21) Appl. No.: 10/881,178

(22) Filed: Jun. 30, 2004

(51) Int. Cl.
*G06F 15/16* (2006.01)
*G06F 15/76* (2006.01)
*G06F 13/00* (2006.01)

(52) U.S. Cl. .................. 709/232; 709/233; 710/10; 712/18; 712/21

(58) Field of Classification Search .................. None
See application file for complete search history.

(56) References Cited

U.S. PATENT DOCUMENTS

| | | | |
|---|---|---|---|
| 4,819,229 A * | 4/1989 | Pritty et al. .................. 370/455 |
| 4,944,038 A | 7/1990 | Hardy et al. |
| 5,046,068 A | 9/1991 | Kubo et al. |
| 5,119,481 A * | 6/1992 | Frank et al. .................. 710/100 |
| 5,257,215 A | 10/1993 | Poon |
| 5,339,266 A | 8/1994 | Hinds et al. |
| 5,386,375 A | 1/1995 | Smith |
| 5,515,308 A | 5/1996 | Karp et al. |
| 5,546,593 A | 8/1996 | Kimura et al. |
| 5,617,418 A * | 4/1997 | Shirani et al. .................. 370/465 |
| 5,619,439 A | 4/1997 | Yu et al. |
| 5,948,089 A | 9/1999 | Wingard et al. |
| 5,954,789 A | 9/1999 | Yu et al. |
| 6,076,157 A | 6/2000 | Borkenhagen et al. |
| 6,088,788 A | 7/2000 | Borkenhagen et al. |
| 6,088,800 A | 7/2000 | Jones et al. |
| 6,105,127 A | 8/2000 | Kimura et al. |
| 6,131,104 A | 10/2000 | Oberman |
| 6,212,544 B1 | 4/2001 | Borkenhagen et al. |
| 6,282,554 B1 | 8/2001 | Abdallah et al. |
| 6,341,347 B1 | 1/2002 | Joy et al. |

(Continued)

OTHER PUBLICATIONS

Tulsen et al., "Power-sensitive multithreaded architecture," IEEE 2000, pp. 199-206.

(Continued)

*Primary Examiner*—Wen-Tai Lin
(74) *Attorney, Agent, or Firm*—Rory D. Rankin; Meyerstons Hood Kivlin Kowert & Goetzel, P.C.

(57) ABSTRACT

A method and mechanism for managing access to a plurality of registers in a processing device are contemplated. A processing device includes multiple nodes coupled to a ring bus, each of which include one or more registers which may be accessed by processes executing within the device. Also coupled to the ring bus is a ring control unit which is configured to initiate transactions targeted to nodes on the ring bus. Each of the nodes are configured receive and process bus transaction with a fixed latency whether or not the first transaction is targeted to the receiving node. The ring control unit is configured to periodically convey idle transactions on the ring bus in order to allow nodes responding to indeterminate transactions to gain access to the bus.

12 Claims, 9 Drawing Sheets

U.S. PATENT DOCUMENTS

| | | |
|---|---|---|
| 6,349,319 B1 | 2/2002 | Shankar et al. |
| 6,357,016 B1 | 3/2002 | Rodgers et al. |
| 6,397,239 B2 | 5/2002 | Oberman et al. |
| 6,415,308 B1 | 7/2002 | Dhablania et al. |
| 6,427,196 B1 | 7/2002 | Adiletta et al. |
| 6,434,699 B1 | 8/2002 | Jones et al. |
| 6,496,925 B1 | 12/2002 | Rodgers et al. |
| 6,507,862 B1 | 1/2003 | Joy et al. |
| 6,523,050 B1 | 2/2003 | Dhablania et al. |
| 6,564,328 B1 | 5/2003 | Grochowski et al. |
| 6,567,839 B1 | 5/2003 | Borkenhagen et al. |
| 6,594,681 B1 | 7/2003 | Prabhu |
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,728,845 B2 | 4/2004 | Adiletta et al. |
| 6,748,556 B1 | 6/2004 | Storino et al. |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |
| 7,131,020 B2 * | 10/2006 | Moll et al. .................. 713/375 |
| 7,194,598 B2 * | 3/2007 | Jacob .......................... 712/10 |
| 2002/0083297 A1 * | 6/2002 | Modelski et al. .............. 712/18 |
| 2004/0073775 A1 * | 4/2004 | Moore et al. ................. 712/201 |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Smith, "The End of Architecture," May 29, 1990, pp. 10-17.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

* cited by examiner

REGISTER ACCESS PROTOCOL IN A MULTIHREADED MULTI-CORE PROCESSOR

BACKGROUND OF THE INVENTION

1. Field of the Invention

The invention relates to computing systems and, more particularly, to a register access protocol.

2. Description of the Related Art

Processing devices such as microprocessors typically include numerous registers which are accessed during operation. Some registers (e.g., general purpose registers) may be configured to store operand data, results of operations, addresses, and so on. Other registers may be configured to store status information concerning the operation of a particular unit of the device. Still other registers may be used to configure devices for operation by writing predetermined data to the registers. Numerous such uses of registers, and others as well, may be found in processing devices and computing devices in general.

As may be appreciated, modern microprocessors are typically designed as multiple units which are configured to communicate and co-operate with one another in order to accomplish larger processing tasks. For example, a basic microprocessor may include an instruction fetch unit, a decode unit, an execution unit, and a write-back unit. Each of these units may generally include configuration, status, and other registers which are specific to the particular unit. During processing it is frequently necessary to access these registers in order to accomplish certain tasks.

In fine grain multithreaded processors it may be necessary for multiple threads to have access to various registers which are distributed throughout various units. Consequently, an orderly and efficient mechanism for managing access to the registers is desired.

SUMMARY OF THE INVENTION

A method and mechanism for managing access to a plurality of registers in a processing device are contemplated. In one embodiment, a processing device includes multiple nodes, each of which include one or more registers which may be accessed by processes executing within the device. Each of the nodes is coupled to a ring bus which is configured to convey read and write access transactions targeted to the node registers. Also coupled to the ring bus is a ring control unit which is configured to initiate the read and write access transactions.

In one embodiment, the ring control unit is configured to convey transactions with either a determinate latency or an indeterminate latency. In response to receiving a transaction, each node coupled to the ring is configured to determine whether the transaction is targeted to that node. If the transaction is not targeted to the receiving node, the node forwards the received transaction on the ring bus to the next node. If the transaction is targeted to the receiving node, the node processes the received transaction. In the event the received transaction corresponds to a transaction with determinate latency, the targeted node processes the transaction and conveys corresponding data upon the ring bus. Corresponding data may include read data responsive to a read access transaction or a write completion acknowledgment. In the event the received transaction corresponds to a transaction with indeterminate latency, the targeted node modifies the received transaction request and forwards the modified transaction on the ring bus with a latency which equals the latency of a determinate latency transaction for that node. When the node completes the transaction with indeterminate latency, the node waits for detection of a bus idle state, or "hole", and then provides a transaction reply (e.g., read data or write acknowledgment) on the bus.

Also contemplated is a ring control unit which conveys transaction requests upon the ring bus as pairs of packets. Each packet pair includes a control packet and a data packet. Control packets include information which identifies the type of transaction, and the data packets may include write data if the transaction is a write access. If the transaction is a read access, the data packet may serve as a container for return of the read data. Control packets may further indicate whether the conveyed transaction is a valid transaction. Nodes on the ring bus may gain access to the ring bus in response to determining a current transaction on the bus is an invalid transaction. In one embodiment, an invalid transaction corresponds to a "hole" or a bus idle state.

In one embodiment, the ring control unit is configured to convey transactions on the ring bus according to a periodic sequence. During the sequence, the ring control unit is configured to convey at least one invalid transaction. In addition, nodes coupled to the ring bus may be configured to process received transaction packets with a fixed latency, regardless of whether the transaction is a targeted to the particular node.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Overview of Multithreaded Processor Architecture

Figure 1:
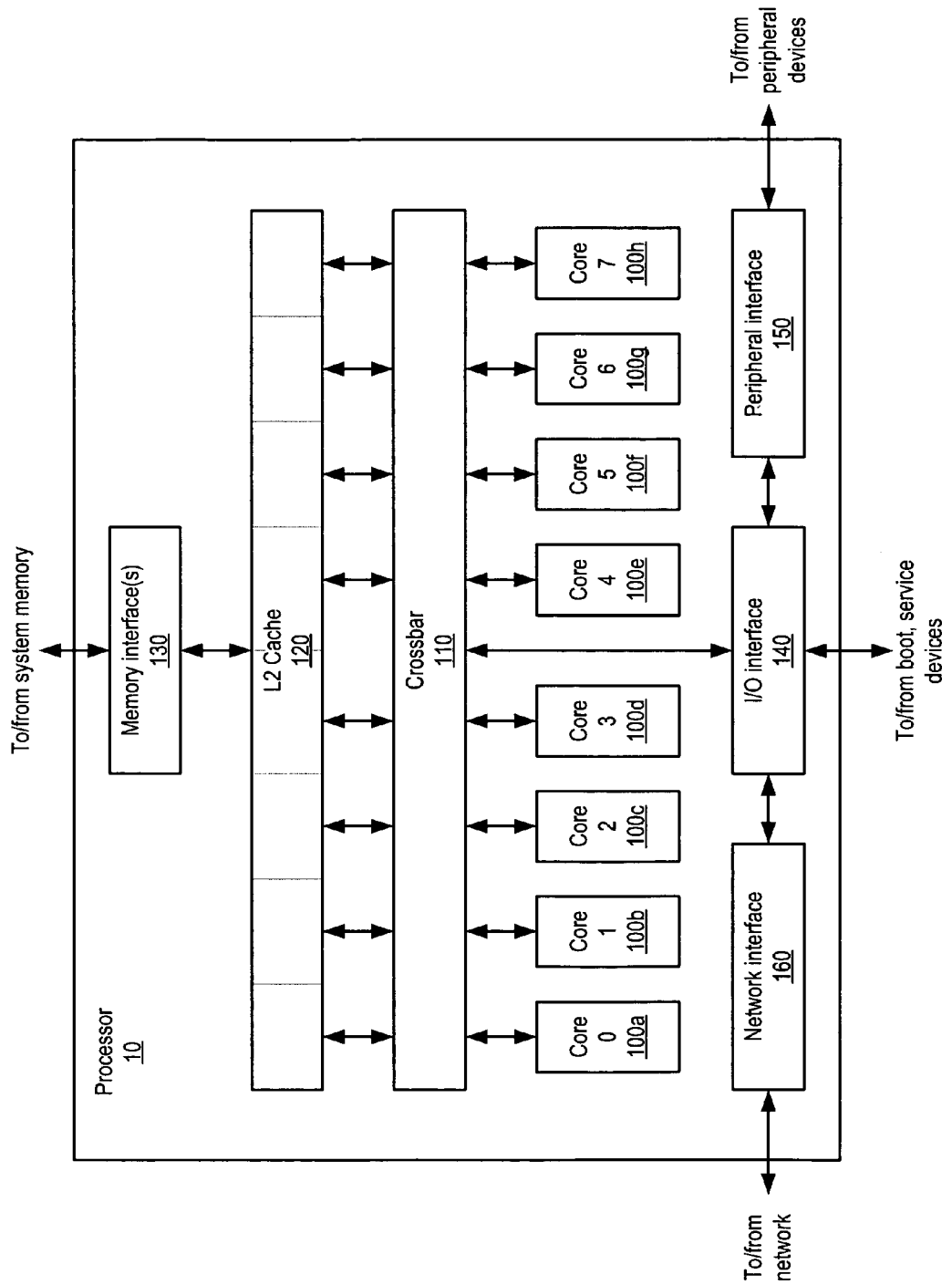
FIG. 1 is a block diagram illustrating one embodiment of a multi-threaded, multi-core microprocessor.

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86, PowerPC or MIPS, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 (Firewire) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
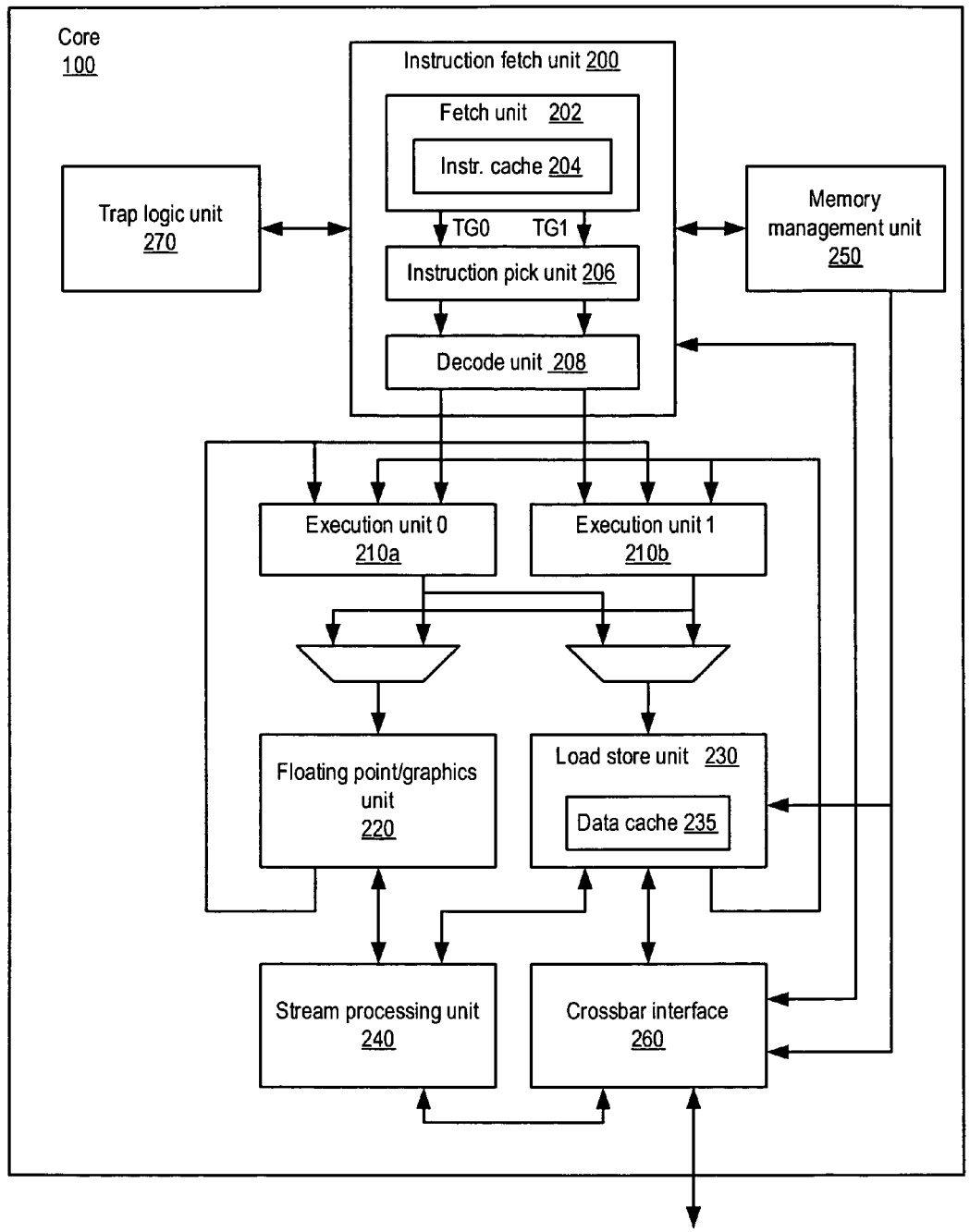
FIG. 2 depicts one embodiment of a core as illustrated in FIG. 1.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 215 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands from FGU 220 or LSU 230, to freely schedule-operations across its various algorithmic subunits and to signal FGU 220 or LSU 230 when a given result is ready to be written back or stored. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate processing of the result (for example, by using dedicated control registers to convey results).

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 215 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 208 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Figure 3:
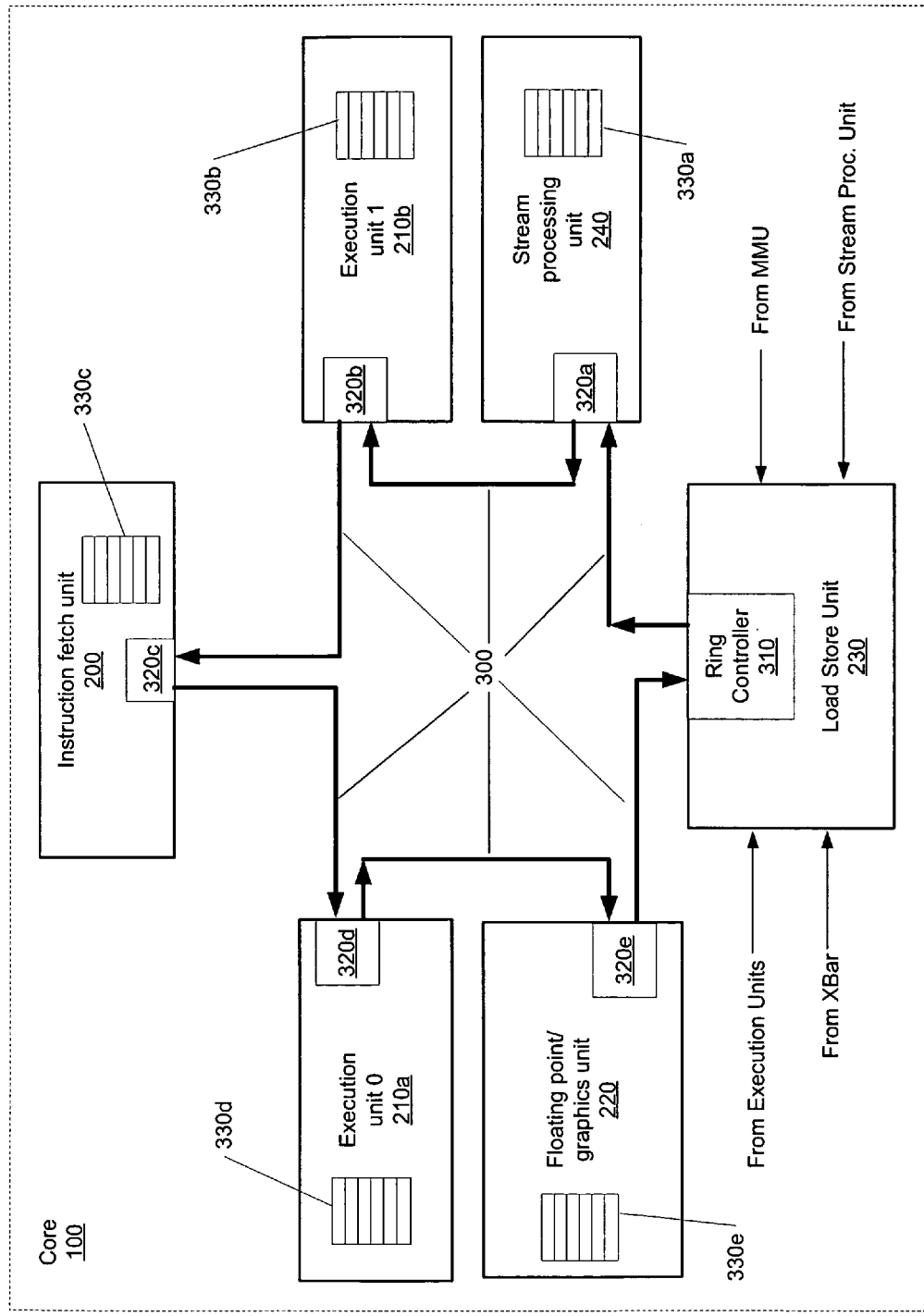
FIG. 3 illustrates one embodiment of a bus ring coupled to multiple units of a processing device.

Turning now to FIG. 3, a portion of core 100 as shown in FIG. 2 is illustrated. In the embodiment shown, load/store unit 230 is shown to include a ring controller 310 coupled to a ring bus 300. Ring bus 300 is further coupled to stream processing unit 240, execution unit 1 210b, instruction fetch unit 200, execution unit 0 210a, and floating point/graphics unit 220. Each of the units coupled to the ring bus 300 further includes interface circuitry configured to receive and process transactions received upon bus 300. For example, stream processing unit 240 includes interface circuit 320a, execution unit 1 210b includes interface circuit 320b, instruction fetch unit 200 includes interface circuit 320c, execution unit 0 210a includes interface circuit 320d, and floating point/graphics unit 220 includes interface circuit 320e.

In addition to the above, each of the units coupled to ring bus 300 include one or more registers 330a-330e which may be accessed via the ring bus 300. In one embodiment, registers 330 may generally correspond to configuration and/or status registers. However, those skilled in the art will appreciate the other types of registers may be utilized as well. Units that are coupled to the ring bus 300 (e.g., units 200, 210, 220 and 240) may be referred to as ring "nodes". Elements referred to herein with a particular reference number followed by a letter may be collectively referred to by the reference number alone. For example, interface circuits 320a-320e may be collectively referred to as interface circuits 320.

In one embodiment, bus 300 is a unidirectional bus configured to convey data in one direction. In the embodiment shown, ring controller 310 is configured to receive read and write requests from the load/store unit 230 and convey corresponding transactions upon ring bus 300. Generally speaking, transactions placed on the ring bus 300 by the ring controller 310 are configured to read from or write to one of registers 330. Transactions which are placed on the ring bus 300 by the ring controller 310 generally identify the register to which it is directed. Upon receiving a transaction upon the bus 300, the interface circuit of a given node is configured to determine whether the register being accessed by the transaction corresponds to that node. If a received transaction corresponds to the receiving node, the transaction is processed within the node. On the other hand, if the transaction does not correspond to the receiving node, the interface circuitry is configured to place the received transaction back onto the bus 300 for forwarding to the next node.

In one embodiment, transactions placed upon bus 300 by the ring controller 310 comprise a control packet followed by a data packet. Generally speaking, the control packet identifies the register being accessed and the type of access being made (e.g., read or write). For a write transaction, the data packet includes the data being written to the register. For a read transaction, the data packet placed on the bus 300 by the ring controller is configured to receive the data being read for transport back to the ring controller. Transactions placed on the bus 300 by the ring controller 310 are generally seen, and acted upon, by ring nodes in a given order. For example, in the embodiment shown, a transaction placed upon the ring bus 300 by the ring controller 310 is first captured by node 240 via interface 320a. Node 240 is configured to convey transactions to node 210b. Node 210b is configured to convey transactions to node 200. Node 200 is configured to convey transactions to node 210a. Node 210a is configured to convey transactions to node 220. Finally, node 220 is configured to convey transactions to ring controller 310. Transactions which are received by a given node which are addressed to that node are processed by that node. Transactions which are received by a given node which are not addressed to that node are forwarded to the next node via bus 300.

In order to manage the flow control of transactions placed upon the bus 300 by the ring controller 310 and replies received by the ring controller 310 from the bus, a protocol is utilized which includes transactions with a determinate (predictable) latency and transactions with an indeterminate (unpredictable) latency. Generally speaking, the latency of a particular transaction may be represented by the difference between the time a transaction is placed on the bus 300 by the ring controller to the time a response corresponding to that transaction is received by the ring controller 310. In the case of a read access transaction, a response may generally include receipt of the data being read. In the case of a write transaction, a response may generally include an acknowledgement that the write has completed.

Determinate transactions are those transactions for which the latency is known by the ring controller 310. For example, in one embodiment the latency of a determinate read or write access to a particular register may not depend on the particular state of the node which contains the register. Consequently, the latency may be fixed for that particular access. On the other hand, indeterminate transactions do not have a known latency. For example, an indeterminate transaction may depend upon the state or other conditions of the node at the time a register access request is received by a given node. In such a case, the node may or may not have to perform or complete certain processing tasks prior to completing the register access request. Consequently, the latency for such a transaction is not fixed.

In one embodiment, only one node may place data upon the bus 300 in a given cycle. Because indeterminate transactions may attempt to place responses upon the ring bus 300 at unknown times, the possibility exists that such a node may be unable to place a response on the bus 300 because new transactions are being continuously placed on the bus 300 by the ring controller 310 and the bus 300 is being maintained in a busy state. In order to ensure that responses corresponding to indeterminate transactions are able to gain access to the bus 300, the ring controller 310 may be configured to refrain from placing new transactions on the bus 300 on a periodic basis. In this manner the ring controller 310 maintains an "idle" state at given times in order to allow ring nodes to gain access to the bus and respond with "indeterminate" response data.

While ring controller 310 may be configured to maintain an "idle" state at varying times, in one embodiment the ring controller 310 is configured to maintain an "idle" state on a periodic basis. The idle state may include the ring controller 310 refraining from placing a new access request on the bus 300 for two consecutive cycles (the two cycles corresponding to what would otherwise be a transaction control packet and data packet) and may be referred to as a "hole". For example, ring controller 310 may be configured to maintain an "idle" state every 16 cycles. Stated differently, the ring controller 310 may be configured to "inject", or place, a hole on the ring bus 310 every 16 cycles. In the event a ring node detects a hole (idle condition) on the bus 300, the node places data on the bus 300. Holes may also be naturally present whenever no other transaction occupies a given time slot.

In addition, in one embodiment the ring controller 310 may also only inject "holes" if there is a pending indeterminate request on the ring. If there are no outstanding indeterminate requests, the full bandwidth of the ring may be used for determinate requests.

In an embodiment where transactions placed on the bus 300 by the ring controller 310 comprise a control packet followed by a data packet, the maximum number of transactions placed on the bus during a 16 cycle period would be 8. Of course periods other than 16 cycles are possible as well. In one embodiment, the ring controller 310 is configured to place a hole on the ring bus 300 by placing a special transaction on the bus 300. The special transaction includes a control packet followed by a data packet similar to an ordinary (read/write access) transaction. However, the control packet for a hole transaction includes data which identifies the transaction as a hole. Upon receiving a hole transaction, a node may examine the control packet and determine from the data contained therein that the transaction corresponds to a hole transaction and the bus 300 is available. If the node has response data ready for transmission, the node may then place the response data on the bus. In order to indicate that data has been placed on the bus, the node may modify the received control packet to indicate response data follows and forward the modified control packet with the response data. In this manner, other nodes which may receive the control packet will not identify the transaction as a hole and attempt to place data on the bus in the corresponding data packet.

Figure 4:
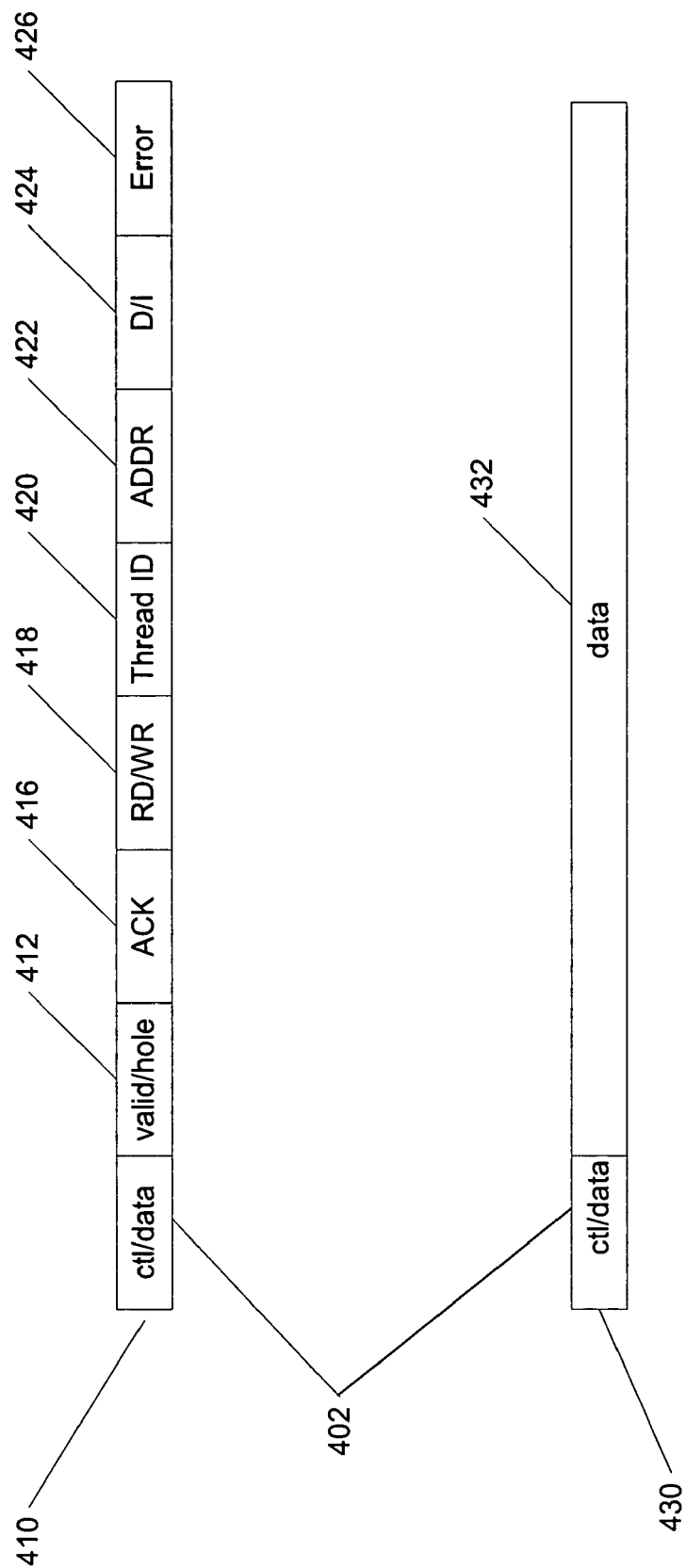
FIG. 4 depicts one embodiment of a control and data packet.

Turning now to FIG. 4, one embodiment of a control packet 410 and a data packet 430 are shown. Each of the control 410 and data 430 packets include a field 402 which identifies the packet as either a control or data packet. In one embodiment, field 402 may comprise a single bit. In addition to field 402, control packet 410 may further include an indication 412 as to whether the transaction is a hole or an access request, an ACK field 416 which may be used to indicate a write completion, a read/write field 418 to indicate whether the transaction is a read access or a write access, a thread ID field 420 which may be used to identify the thread which originated the access request, an address field 422 which may be used to identify the address of the register being accessed, a determinate/indeterminate field 424 to indicate whether the transaction is determinate or indeterminate, and an error field 426 which may be used by a ring node to indicate an error condition. Data packet 430 further includes a data field 432 to store read or write data. ACK field 416 may also be used by a node to indicate a transaction has been received by the node to which it is directed. In this manner, other nodes which see the control packet may simply ignore and forward the packet.

Figure 5:
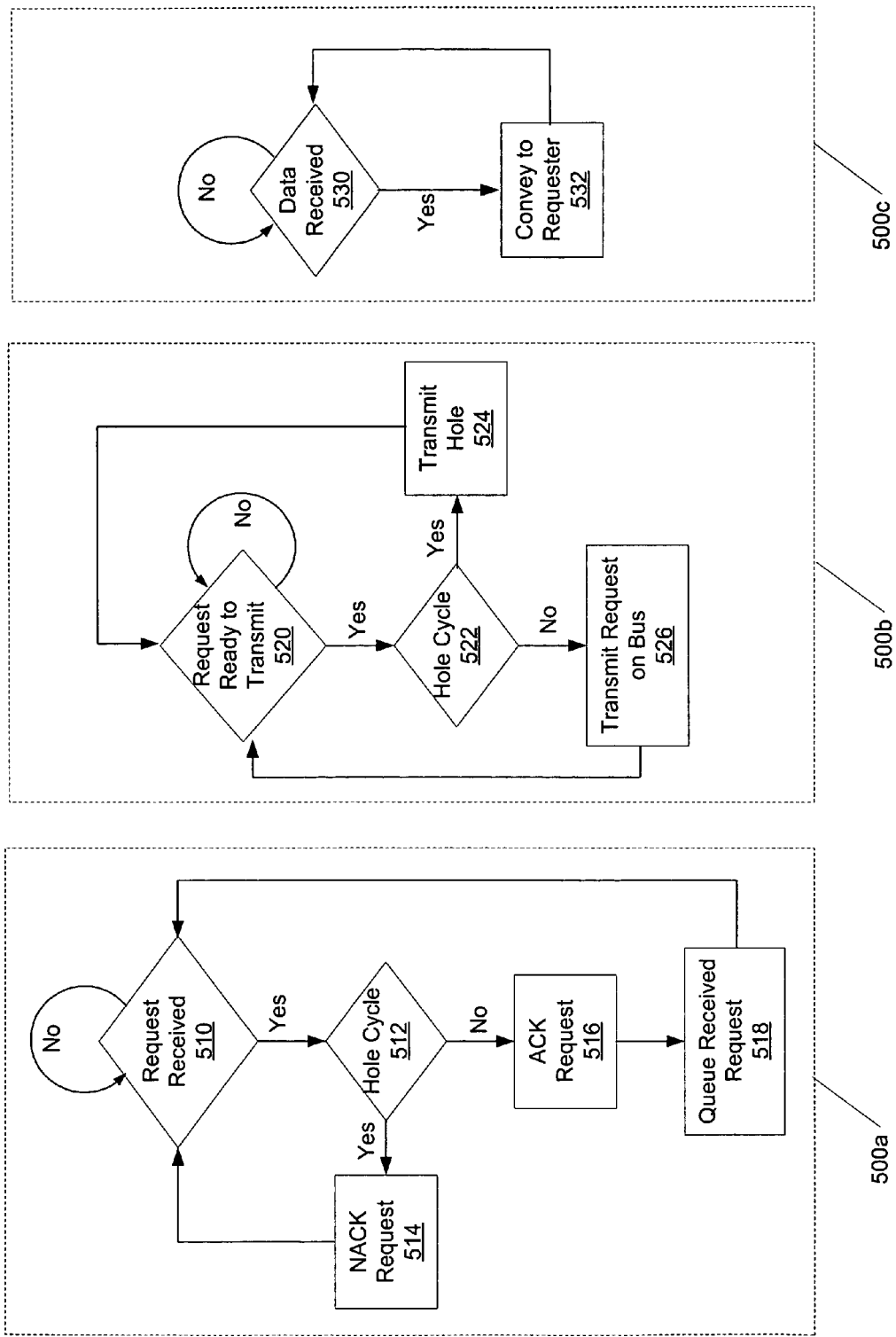
FIG. 5 shows one embodiment of a flow diagram corresponding to a ring bus protocol.

FIG. 5 illustrates one embodiment of processing which may occur within ring controller 310. In the example shown, three groups of activities (500a, 500b, and 500c) are illustrated. A first processing activity 500a generally corresponds to activities performed by the ring controller 310 in response to requests received from the load/store unit 230. A second activity 500b is illustrated which generally corresponds to activities initiated upon the ring bus 300 by the ring controller 310. Finally, a third activity 500c is shown which generally corresponds to activities performed by the ring controller 310 in response to data received from the ring bus 300. Generally speaking, the activities 500 depicted in FIG. 5 may occur in any order and/or may occur concurrently.

In the example shown, the ring controller is configured to await requests from the load/store unit 230 in decision block 510. If a request is received, the ring controller determines whether the current cycle corresponds to a hole cycle (decision block 512). If the current cycle is a hole cycle, the ring controller may respond to the request with a negative acknowledgement (NACK) (block 514), or otherwise refuse the new request. On the other hand, if the current cycle is not a hole cycle, the ring controller 310 may accept and acknowledge (ACK) the request (block 516) and queue the received request for further processing (block 518). Requests received from the load/store unit 230 may include a thread ID of the thread which initiated the request, the address of the register being accessed, and whether the access is a read or write.

If the ring controller 310 has a pending request ready for transmission (decision block 520), the ring controller 310 first determines whether the current cycle is a hole cycle (decision block 522). If the current cycle is a hole cycle, the ring controller 310 transmits (injects) a hole on the ring bus 300 (block 524). Injecting a hole on the ring bus may also be referred to as placing an idle transaction on the bus. As already noted, the ring controller 310 may also be configured to inject holes on the ring bus 300 on a periodic basis irrespective of whether or not there is a pending request ready for transmission as depicted by decision block 520. In one embodiment, the ring controller 310 is configured to place transactions on the ring bus every cycle—either access transactions or holes. If a request is pending (decision block 520) and the current cycle is not a hole cycle (decision block 522), the ring controller may transmit the pending request/transaction on the bus 300. In one embodiment, particular registers 330 may be categorized as being accessible in either a determinate or indeterminate manner. If an access request corresponds to a "determinate" register, the ring controller 310 may set an indication in the determinate/indeterminate field 424 of the control packet to indicate this fact. Otherwise, the field is set to indicate the transaction corresponds to an indeterminate access request. Other fields of the control packet (e.g., ctl/data 402, valid/hole 412, RD/WR 418, thread ID 420, ADDR 422 of the register, are also set as appropriate by the ring controller 310.

Finally, activity 500c illustrates that subsequent to receiving transaction data (decision block 530) upon the ring bus 300 (e.g., in response to a read access request), the ring controller 310 conveys the read data to the requesting load/store unit 230. Included in the response received by the ring controller 310 is a control packet which includes identifying information such as the thread ID 420 and ADDR 422 of the register. This identifying information is also returned to the load/store unit 230 in order to facilitate identification of the request to which the data corresponds.

Figure 6:
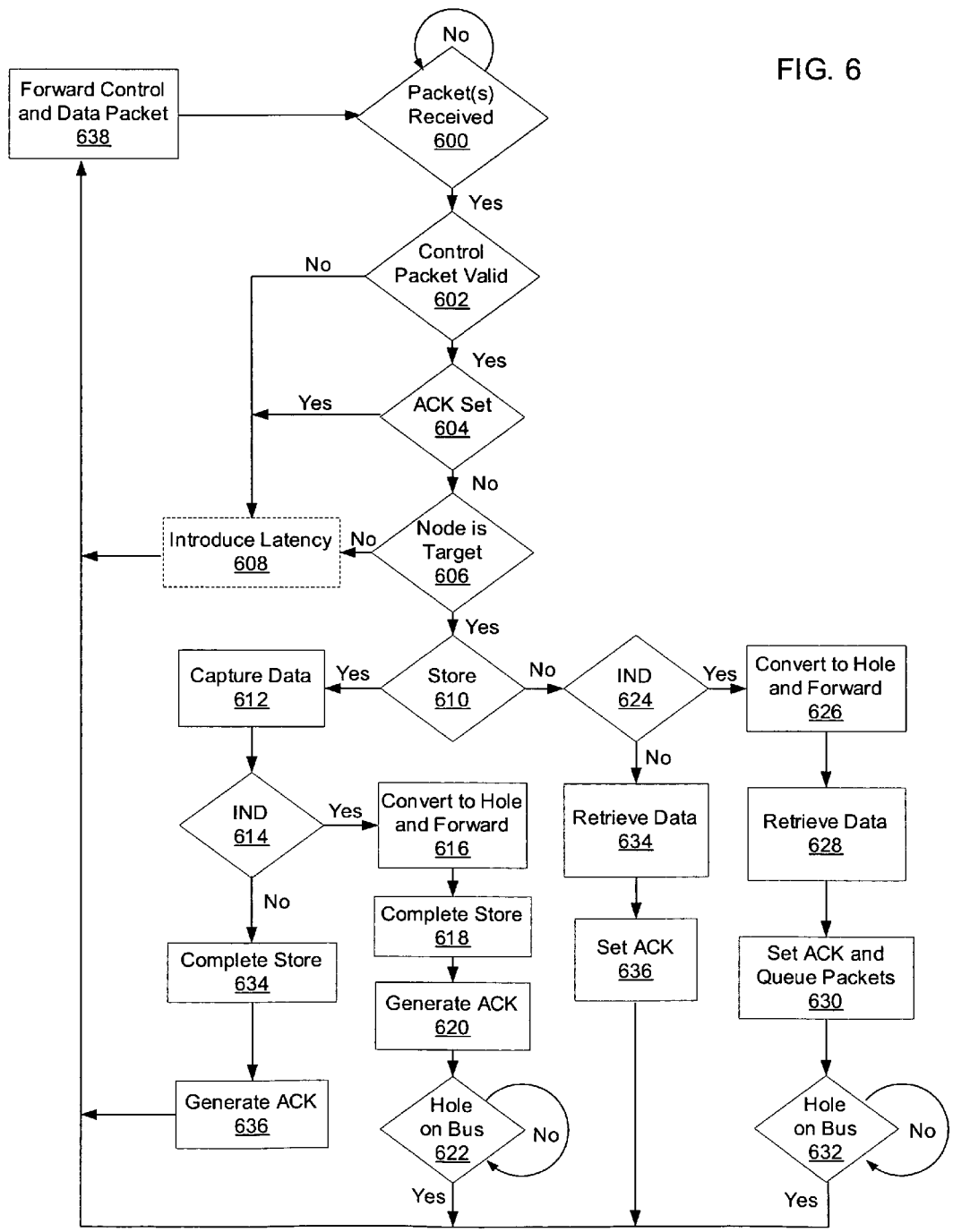
FIG. 6 shows one embodiment of a flow diagram corresponding to a ring bus protocol.

Turning now to FIG. 6, one embodiment of the processing which may occur within a ring node is illustrated. In response to receiving a transaction (decision block 600) via the ring bus 300, a node may first determine whether the corresponding control packet is valid or a hole (decision block 602). If the control packet indicates the transaction is a hole transaction, processing flows through optional block 608 for the introduction of a latency, and the transaction control and data packets are forwarded on the ring bus 300 by the node. Block 608 may be used to introduce a latency which is equal to the latency a determinate transaction would have within the particular node. By maintaining the same latency through a given node, whether or not a transaction is directed to that node, the latency for all determinate transactions on the ring bus 300 may be fixed. Otherwise, latencies might vary from one determinate transaction to another. By fixing the latency in this manner, flow control may be ensured and logic may be simplified.

If a received packet is not a hole (decision block 602), the node may check the control packet ACK field to see if the transaction has already been received by the node to which it is directed. If the ACK field is set, processing may continue to block 608 as described above. Otherwise, the node examines the control packet to determine whether the transaction is directed to one of its registers (decision block 606). If the receiving node is not the target, processing continues with block 608. If the receiving node is the target of the transaction, the node may determine whether the transaction is a read or write (load or store) transaction (decision block 610). If the transaction is a store, the node captures the data (block 612) and then determines whether the transaction is indeterminate (decision block 614). If the transaction is not indeterminate, the store is completed (block 634), the control packet is modified to acknowledge a write completion (block 636), and the modified control packet and a data packet are forwarded (block 638) on the ring bus 300. In one embodiment, the data packet which was received with the transaction is forwarded unmodified.

If the received store transaction is indeterminate (decision block 614), the control packet is modified to identify it as corresponding to a hole transaction and the modified control packet and the data packet are forwarded (block 616) on the bus 300. Subsequently, the write transaction is completed (block 618) and a control packet including an acknowledgement of the write completion is generated (block 620). When a hole is identified on the bus (decision block 622), the write completion control packet and a data packet are conveyed on the bus 300.

In the event a node receives a read access which is directed to it (decision block 610), the node determines whether the transaction is indeterminate (decision block 624). If the transaction is not indeterminate, the requested data is retrieved (block 635), the control packet is modified to indicate an acknowledgement of the read access (block 637), the retrieved data is placed in the transaction data packet, and the modified control and data packet are forwarded on the bus (block 638). If the transaction is indeterminate (decision block 624), the control packet is modified to identify it as a hole packet and the control and data packets are forwarded on the bus (block 626). Subsequently, the read access data is obtained (block 628) and stored in a data packet, a control packet with acknowledgement is generated (block 630), and when a hole on the bus is detected (decision block 632) the control and data packets are forwarded on the bus (block 637).

In certain situations, a ring node may be unable to respond to an access request due to errors, exceptions, or other special conditions within the node. In such situations, the receiving node may be configured to modify the corresponding control packet to indicate an error condition, and optionally provide some identification as to the type of error condition, and forward the modified control and data packets on the ring bus. In response to receiving the control packet with the error indication, the ring controller may be configured to provide the indication to the load/store unit which may then cancel or otherwise not complete the requested transaction. The error may result in a program exception, for example, by the load-store unit 230 generating a trap request to the Trap Logic Unit 270. Generally speaking, resolution of the error condition within a given ring node is the responsibility of the node and perhaps other exception handling mechanisms.

Figure 7:
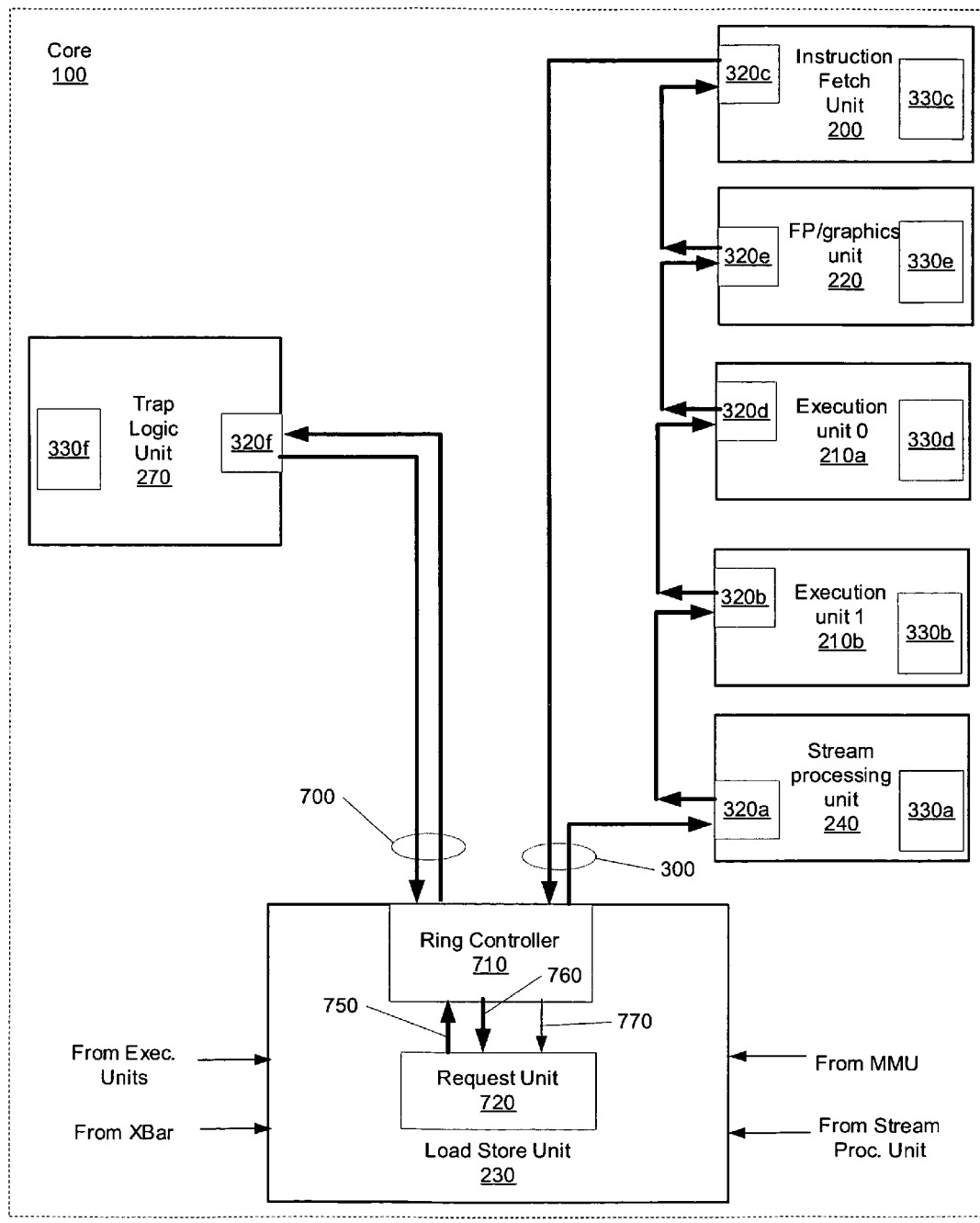
FIG. 7 illustrates one embodiment of multiple bus rings coupled to a ring controller.

FIG. 7 depicts an embodiment wherein more than one ring bus is coupled to a ring controller. In the embodiment shown, a separate bus 700 is coupled between the Trap Logic Unit 270 and a ring controller 710. Also illustrated are ring bus 300 and nodes (240, 210a, 210b, 220, and 200) which generally correspond to those previously described. Because certain interrupt or exception conditions may require handling with very low latencies, it may be desirable to have a separate bus 700 with lower latency dedicated for such a purpose. Similar to the previously described nodes, the Trap Logic Unit 270 may also include a bus interface 320f and registers 330f.

In the embodiment shown, load store unit 230 includes a request unit 720 configured to convey access requests to ring controller 710. Ring controller 710 is coupled to request unit 720 via a request bus 750, a response bus 760, and a retry signal 770. Retry signal 770 may be used by ring controller 710 to indicate that the current cycle is a hole cycle and the request unit 720 should attempt the request at a later cycle. As described above, ring controller 710 is configured to receive requests and place corresponding transactions upon the bus. However, in the example shown, transactions may be placed on either bus 700 or bus 300 depending upon the location of the target address. While the ring controller 710 may still only issue a single transaction at a time, the differing latencies between bus 700 and bus 300 may result in the ring controller 710 receiving more than one response at a time. In the above described embodiment, each transaction comprises a control and a data packet. Consequently, were the ring controller 710 to convey replies to the request unit 720 via a control and data packet over two cycles, the ring controller 710 may be overrun by responses received from the buses 700 and 300. In order to accommodate the increased bandwidth of concurrently received responses from the buses 700 and 300, response bus 760 may be configured with a width equal to or greater than the size of a combined control and data packet.

Figure 8:
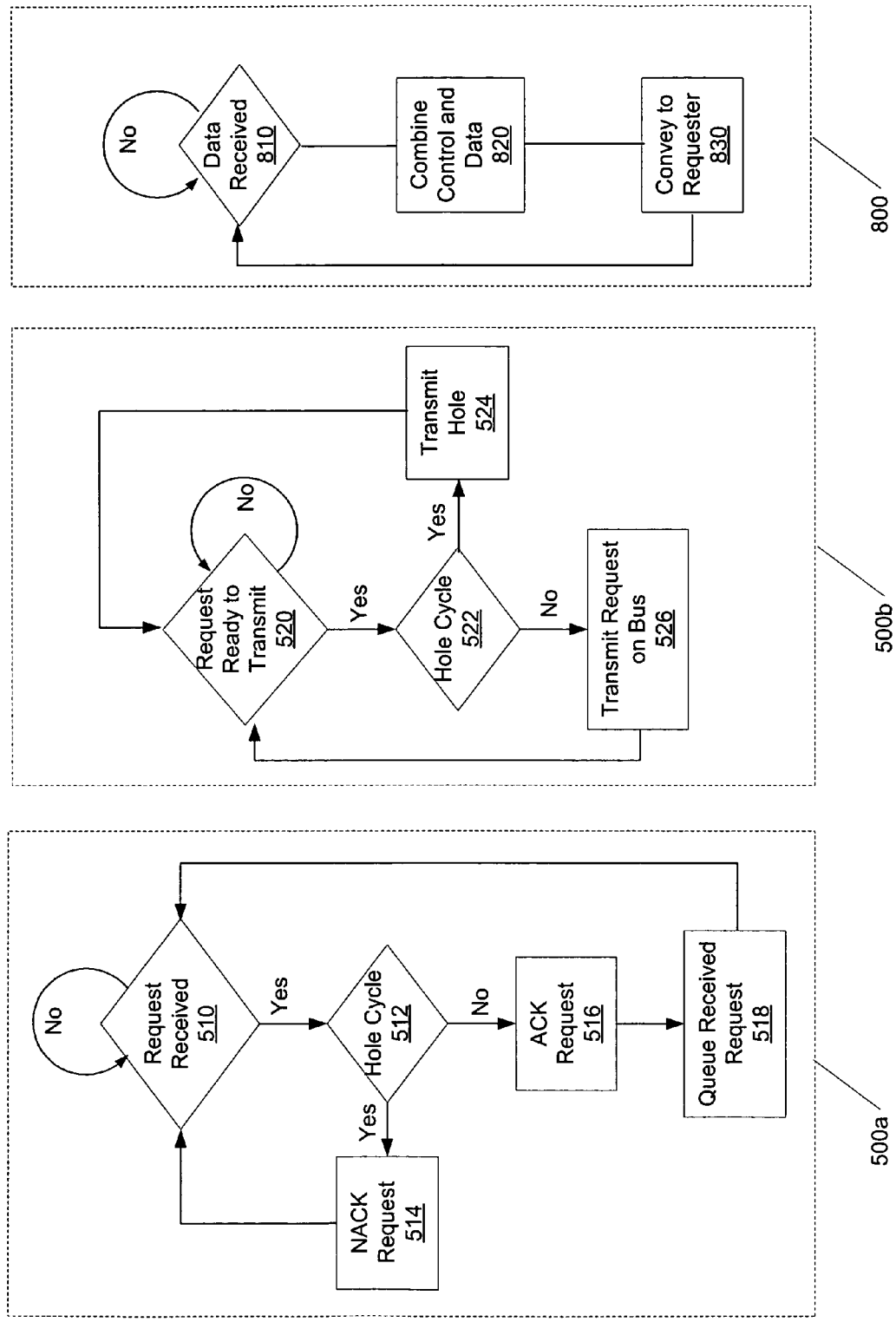
FIG. 8 shows one embodiment of a flow diagram corresponding to a ring bus protocol.

FIG. 8 depicts processing within ring controller 710. Generally speaking, activities 500a and 500b are as described in FIG. 5. Activity 800 indicates that subsequent to receiving data (decision block 810), control and data packets may be combined (block 820) and conveyed to the request unit 720 concurrently (block 830).

Exemplary System Embodiment

Figure 9:
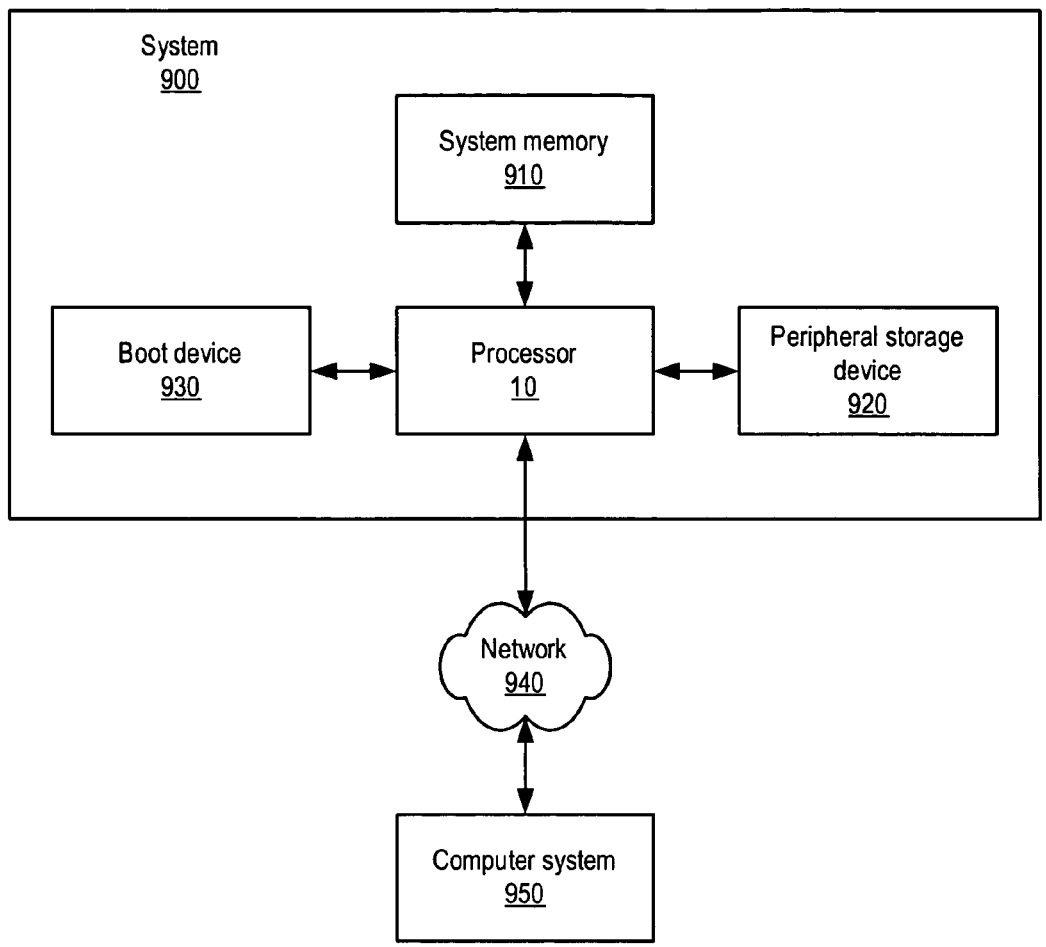
FIG. 9 illustrates one embodiment of a computing system.

As described above, in some embodiments processor 10 of FIG. 1 may be configured to interface with a number of external devices. One embodiment of a system including processor 10 is illustrated in FIG. 9. In the illustrated embodiment, system 900 includes an instance of processor 10 coupled to a system memory 910, a peripheral storage device 920 and a boot device 930. System 900 is coupled to a network 940, which is in turn coupled to another computer system 950. In some embodiments, system 900 may include more than one instance of the devices shown, such as more than one processor 10, for example. In various embodiments, system 900 may be configured as a rack-mountable server system, a standalone system, or in any other suitable form factor. In some embodiments, system 900 may be configured as a client system rather than a server system.

In various embodiments, system memory 910 may comprise any suitable type of system memory as described above, such as FB-DIMM, DDR/DDR2 SDRAM, or RDRAM®, for example. System memory 910 may include multiple discrete banks of memory controlled by discrete memory interfaces in embodiments of processor 10 configured to provide multiple memory interfaces 130. Also, in some embodiments system memory 910 may include multiple different types of memory.

Peripheral storage device 920, in various embodiments, may include support for magnetic, optical, or solid-state storage media such as hard drives, optical disks, nonvolatile RAM devices, etc. In some embodiments, peripheral storage device 920 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 930 may include a device such as an FPGA or ASIC configured to coordinate initialization and boot of processor 10, such as from a power-on reset state. Additionally, in some embodiments boot device 930 may include a secondary computer system configured to allow access to administrative functions such as debug or test modes of processor 10.

Network 940 may include any suitable devices, media and/or protocol for interconnecting computer systems, such as wired or wireless Ethernet, for example. In various embodiments, network 940 may include local area networks (LANs), wide area networks (WANs), telecommunication networks, or other suitable types of networks. In some embodiments, computer system 950 may be similar to or identical in configuration to illustrated system 900, whereas in other embodiments, computer system 950 may be substantially differently configured. For example, computer system 950 may be a server system, a processor-based client system, a stateless "thin" client system, a mobile device, etc.

It is to be understood that the above embodiments are intended to be exemplary only. For example, the various features described herein may be combined in different ways than those explicitly discussed. Numerous alternative configurations are possible and are contemplated.

The invention claimed is:

1. A system comprising:
 a ring bus configured to convey transaction data;
 a plurality of nodes coupled to said bus, wherein each of the nodes receive transactions on the ring bus in a predetermined order; and
 a ring control unit configured to place transactions on the bus;
 wherein each of the nodes coupled to the ring bus is configured to:
  receive a first transaction conveyed on the ring bus;
  process the first transaction with a given latency if the node that receives the first transaction is a node to which the first transaction is targeted; and
  process the first transaction with the given latency if the node that receives the first transaction is not a node to which the first transaction is targeted;
 wherein the ring control unit is configured to periodically place an idle transaction on the ring bus;

wherein a first node of the plurality of nodes forwards a completion control packet on the ring bus, responsive to receiving a control packet which is identified as corresponding to an idle transaction;

wherein register access transactions comprise either determinate latency register access transactions or indeterminate latency register access transactions, and wherein a latency of a particular transaction is represented by a difference between a time the particular transaction is placed on the bus by the ring control unit and a time a response corresponding to the particular transaction is received by the ring control unit;

wherein in response to a first node determining a particular register access transaction received by the first node is targeted to the first node and is an indeterminate latency transaction, the first node is configured to:

modify a received control packet which corresponds to the particular register access transaction, wherein the modified control packet indicates the modified control packet corresponds to an idle transaction; and forward the modified control packet on the ring bus.

2. The system as recited in claim 1, wherein each transaction placed on the ring bus by the ring control unit comprises a control packet and a data packet, and wherein each transaction comprises either a register access transaction corresponding to one of the nodes or an idle transaction, wherein idle transactions are identified as idle transactions by an indication included in a corresponding control packet.

3. The system as recited in claim 1, wherein in response to the first node determining the particular register access transaction is targeted to the first node and is an indeterminate latency transaction, the first node is further configured to:

perform a register access identified by the particular transaction; and forward on the ring bus a completion control packet which indicates completion of the particular transaction with respect to the first node.

4. The system as recited in claim 1, wherein in response to determining the particular register access transaction is targeted to the first node and is a determinate latency transaction, the first node is configured to:

perform a register access identified by the particular transaction;

modify a received control packet which corresponds to the particular transaction, wherein the modified control packet indicates completion of the particular transaction with respect to the first node; and forward the modified control packet on the ring bus.

5. A method comprising:

conveying a first transaction on a ring bus, said ring bus being coupled to a plurality of nodes which are configured to receive transactions on the bus in a predetermined order;

receiving said first transaction at a first node coupled to the ring bus; and processing the first transaction with a given latency if the node that receives the first transaction is a node to which the first transaction is targeted; and processing the first transaction with the given latency if the node that receives the first transaction is not a node to which the first transaction is targeted;

periodically placing an idle transaction on the ring bus;

wherein a first node of the plurality of nodes forwards a completion control packet on the ring bus, responsive to receiving a control packet on the ring bus which is identified as corresponding to an idle transaction;

wherein register access transactions comprise either determinate latency register access transactions or indeterminate latency register access transactions, and wherein a latency of a particular transaction is represented by a difference between a time the particular transaction is placed on the bus by the ring control unit and a time a response corresponding to the particular transaction is received by the ring control unit;

wherein in response to the first node determining a particular register access transaction is targeted to the first node and is an indeterminate latency transaction, the method further comprises the first node:

modifying a received control packet which corresponds to the particular register access transaction, wherein the modified control packet indicates the modified control packet corresponds to an idle transaction; and forwarding the modified control packet on the ring bus.

6. The method as recited in claim 5, wherein the transaction comprises a control packet and a data packet, and wherein the transaction comprises either a register access transaction corresponding to one of a plurality of nodes coupled to the ring bus or an idle transaction, wherein idle transactions are identified as idle transactions by an indication included in a corresponding control packet.

7. The method as recited in claim 5, wherein in response to the first node determining the particular register access transaction is targeted to the first node and is an indeterminate latency transaction, the method further comprises the first node:

performing a register access identified by the particular transaction; and forwarding a completion control packet on the ring bus which indicates completion of the particular transaction with respect to the first node.

8. The method as recited in claim 5, wherein in response to determining the particular register access transaction is targeted to the first node and is a determinate latency transaction, the method further comprises the first node:

performing a register access identified by the particular transaction;

modifying a received control packet which corresponds to the particular transaction, wherein the modified control packet indicates completion of the particular transaction with respect to the first node; and forwarding the modified control packet on the ring bus.

9. A multi-threaded, multi-core processing system comprising:

a plurality of cores;

a memory interface; and a network interface;

wherein a first core of said cores includes:

a ring bus configured to convey transaction data;

a plurality of nodes coupled to said ring bus, wherein each of the nodes receive transactions on the ring bus in a predetermined order; and a ring control unit configured to place transactions on the ring bus;

wherein each of the nodes within the first core is configured to:

receive a first transaction conveyed on the ring bus;

process the first transaction with a given latency if the node that receives the first transaction is a node to which the first transaction is targeted; and process the first transaction with the given latency if the node that receives the first transaction is not a node to which the first transaction is targeted;

wherein the ring control unit is configured to periodically place an idle transaction on the ring bus;

wherein a first node of the plurality of nodes forwards a completion control packet on the ring bus, responsive to receiving a control packet which is identified as corresponding to an idle transaction;

wherein register access transactions comprise either determinate latency register access transactions or indeterminate latency register access transactions, and wherein a latency of a particular transaction is represented by a difference between a time the particular transaction is placed on the bus by the ring control unit and a time a response corresponding to the particular transaction is received by the ring control unit;

wherein in response to a first node determining a particular register access transaction received by the first node is targeted to the first node and is an indeterminate latency transaction, the first node is configured to:

modify a received control packet which corresponds to the particular register access transaction, wherein the modified control packet indicates the modified control packet corresponds to an idle transaction; and forward the modified control packet on the ring bus.

10. The multi-threaded, multi-core processing system as recited in claim 9, wherein each transaction placed on the ring bus by the ring control unit comprises a control packet and a data packet, and wherein each transaction comprises either a register access transaction corresponding to one of the nodes or an idle transaction, wherein idle transactions are identified as idle transactions by an indication included in a corresponding control packet.

11. The system as recited in claim 9, wherein the ring control unit is configured to place transactions on the ring bus responsive to requests received from a requester.

12. The system as recited in claim 11, wherein the requester generates requests in response to thread instructions executed within a load/store unit.

* * * * *